March 28, 1939. W. SCHAAKE 2,151,804
CURRENT COLLECTOR
Filed March 20, 1937
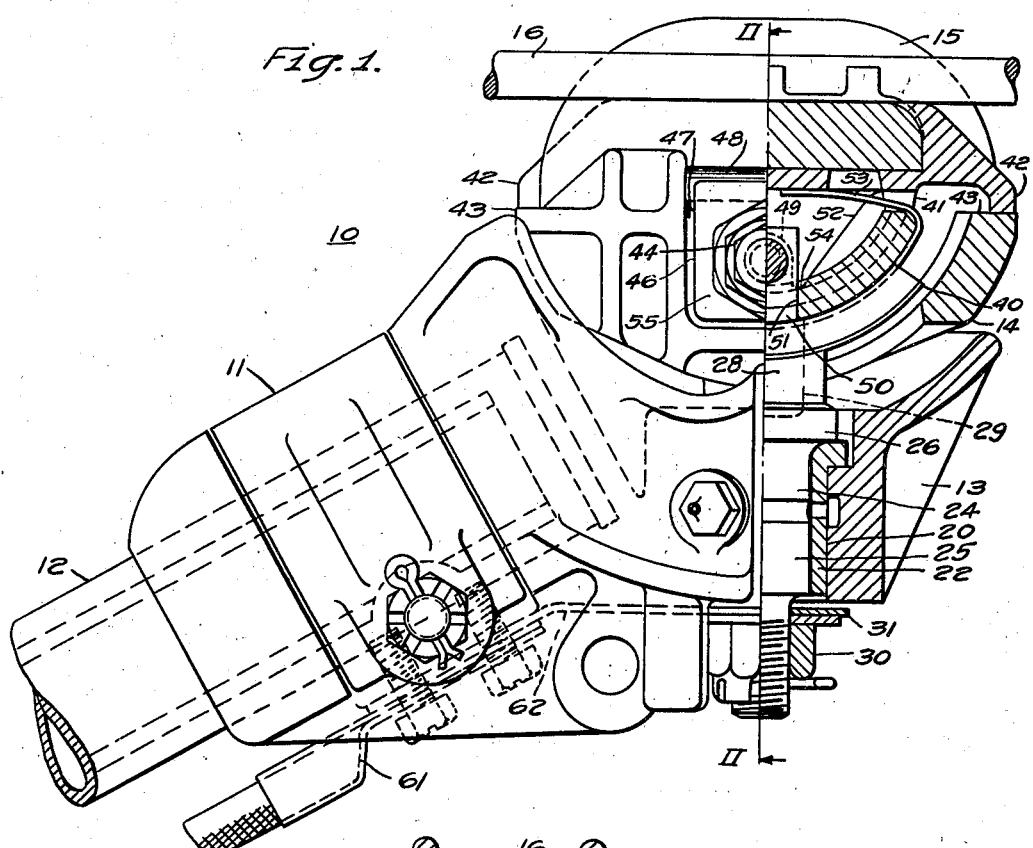
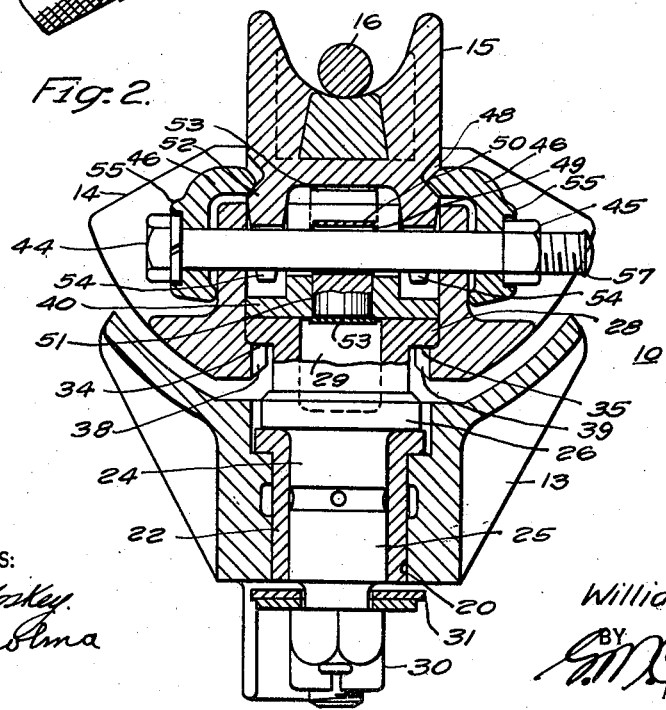
WITNESSES:
INVENTOR
William Schaake.

Patented Mar. 28, 1939

2,151,804

UNITED STATES PATENT OFFICE 2,151,804

CURRENT COLLECTOR

William Schaake, Pittsburgh, Pa., assignor to Westinghouse Electric & Manufacturing Company, East Pittsburgh, Pa., a corporation of Pennsylvania Application March 20, 1937, Serial No. 132,077

12 Claims. (Cl. 191—59.1)

My invention refers, generally, to overhead trolley systems, and it has reference in particular to a current collecting device for use on trolley poles of electrically operated vehicles, such for example, as trolley busses.

It has been found advantageous in overhead trolley systems to provide for the ready renewal of all parts most subjected to wear. In this respect light and easily removable wear plates have been utilized for trolley frogs and crossings, while removable underruns and approaches have been devised for use with trolley wire splicers and hangers.

Trolley slider shoes have purposely been made of relatively soft materials in order to prevent excessive wear of the overhead system, which is relatively difficult to install and expensive to maintain. As slider shoes constructed of soft materials are prone to wear rapidly, it may be seen that slider shoes of such design must often be replaced. It is therefore desirable to facilitate the removal of a worn slider shoe from a current collector or trolley pole head and its replacement by a new slider shoe.

It is, therefore, generally an object of my invention to provide a current collector device for a trolley pole which shall have readily renewable wearing parts.

A further object of my invention is to provide a current collector for a trolley pole wherein the slider shoe element is detachably secured thereto by clamping means.

A yet further object of my invention is to provide clamp means which may be assembled as a unit with the body of the current collector device, for securing a renewable slider shoe in the current collector device.

Another object of my invention is to provide for utilizing a flat spring member for maintaining electrical contact between the slider shoe and the fixed body portion of the current collector device.

Another object of my invention is to provide a current collector device for a trolley pole having a swivel member provided with oppositely disposed recesses with clamp members positioned in the recesses and actuated by a single bolt member to detachably secure a slider shoe to the swivel member.

Other objects will, in part, be obvious, and in part, appear hereinafter.

In a general application of a preferred form of my invention, a current collector or trolley pole head may be provided with a swivel body member mounted on a vertically disposed rotatable stem in a fixed portion of the head and adapted to rotate in a plurality of planes. To engage a trolley wire, a slider shoe may be removably secured to the swivel body by a single through bolt passing through transverse openings in the swivel body. Clamping means associated with the single through bolt are adapted upon tightening of the bolt to engage longitudinal grooves in the slider shoe and secure the slider shoe in fixed relation to the swivel body member. The slider shoe may be removed by loosening the through bolt, which frees the clamping members from the grooves while retaining them in association with the swivel body.

For a more complete understanding of the nature and scope of my invention, reference may be had to the following detailed description, taken in connection with the accompanying drawing, in which:

Figure 1 is a side elevational view partly in section of a current collector device embodying the principal features of my invention; and, Fig. 2 is a sectional view of the current collector device of Fig. 1 taken along the lines II—II of Fig. 1.

Referring more particularly to Figs. 1 and 2 of the drawing, the reference numeral 10 denotes, generally, a trolley pole head comprising clamping means 11 adapted to secure the pole head to a trolley pole 12 of an electrically operated vehicle (not shown), a fixed bearing member 13 supported by the clamping means, and a rotatable swivel member 14 to which is secured a slider shoe 15, adapted to engage the trolley wire 16.

In order to mount the swivel member 14 rotatably on the pole head 10, the bearing member 13 may be provided with a vertical opening 20 in which may be secured a bearing bushing 22, wherein a stem member 24 is disposed to rotate. The stem member 24 may comprise generally a cylindrical bearing portion 25 terminated at the upper end by a bearing flange 26, which is disposed to engage the upper end of the bearing bushing 22. The stem member 24 is provided at its upper end with a bearing segment 28 to engage the swivel body 14 in rotatable relation. A central opening 29 in the bearing segment 28 and stem 24 forms a well wherein a supply of lubricant may be placed. In order to maintain the stem 24 firmly in the bearing bushing 22 and yet permit rotation, the lower end of the stem 24 may be threaded and provided with a castellated nut 30 and bearing washers 31.

The bearing segment 28 is machined on the upper surface, and at the edges 34 and 35 on the under side to provide arcuate bearing surfaces. These surfaces 34 and 35 are disposed to engage inwardly projecting arcuate wear flanges 38 and 39 which are provided on either side of a longitudinal recess on the under side of the swivel body member 14, and so provide for associating the swivel member and fixed bearing member in movable relation.

An arcuate wear plate 40, which is machined on its upper side to provide a bearing surface for the upper surface of the bearing segment 28, is disposed to engage downwardly extending bosses 41 on the slider shoe 15. The downwardly projecting bosses 42 of the slider shoe 15 rest against the seating surfaces 43 on the outer ends of the swivel body member 14 to support the slider shoe 15 in the swivel body 14.

It may therefore be seen from Fig. 1 that the slider shoe 15 engages both ends of the swivel body member 14 and the arcuate wear plate 40, and from Fig. 2 that the bearing segment 28 of the rotatable stem 24 is positioned between the bearing surfaces of the arcuate wear plate and the swivel member. The stem, arcuate wear plate and swivel member may be held in assembled relation by means of a bolt 44 extending transversely through suitable openings in the recessed sides of the swivel member and having a nut 45 in engagement therewith.

In order to provide for securing the slider shoe 15 to the swivel member 14 in such manner that it may be readily detached therefrom, clamp members 46 are used. The clamp members 46 are carried by the bolt 44 and are positioned in the recesses 47 on opposite sides of the swivel. The slider shoe 15 is provided on opposite sides with longitudinal grooves 48 positioned to receive the jaws of the clamp members when the bolt 44 is tightened. The bolt 44, by passing through the transverse bore 49 of the pin 50 which is provided with a snug fit in the central opening 51 of the arcuate wear plate 40, maintains the wear plate 40 in operating relation with the swivel body 14, and at the same time secures the slider shoe 15 to the swivel body 14.

A flat spring member 53 may be positioned between the bearing segment 28 and the arcuate wear plate 40 with its ends sprung inwardly to bear against the underside of the slider shoe 15 to provide for conducting current from the slider shoe to the stem member 24, which is connected to the cable terminal 61 by a shunt 62.

A unit assembly, comprising the slider shoe 15, swivel body 14, arcuate wear plate 40, clamp members 46, bolt member 44 and the pin 50, is thereby provided in which the slider shoe 15 is free to rotate about a horizontal axis with respect to the stem member 24, and about a plurality of axes with respect to the fixed bearing member 13.

To facilitate in assembling the slider shoe 15 in the swivel body 14, downwardly extending side flanges 52 on the slider shoe 15 may be provided with an upwardly extending slot, forming guide fingers 54 at either side of the slot, which may readily be positioned about the bolt 44 to aline the shoe in the swivel. A flange 55 about the bolt hole on a clamp member 46 may provide a snug fit about the nut 45 to prevent it from turning. To prevent separation of the nut 45 from the bolt, when loosened, a restriction 57 formed by slightly riveting the end of the bolt 44 may be provided.

In order to replace a worn slider shoe 15, it may be seen that the only necessary operations are to apply a socket wrench or other means to the head of the bolt 44, give it a few turns to release the clamping members 46 from the longitudinal grooves 48 in the slider shoe, and the worn slider shoe may then be lifted clear of the swivel body member 14. A new slider shoe may readily be inserted merely by slipping it into place in the swivel body so that the downwardly extending guide fingers 54 of the slider shoe are positioned about the through bolt member 44 and tightening the clamp members 46 into the longitudinal grooves 48 of the slider shoe with a few turns of the through bolt member 44.

It may therefore be seen that in my invention I have provided for the ready removal of a worn slider shoe from a trolley pole head by means that are simple to operate and easy to manufacture. A minimum of operations is required to renew a worn trolley shoe and there are no loose parts to be lost or misplaced in the operation.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. The combination in a current collector of a slider shoe having grooves in the sides thereof, and an assembly including a rotatable bearing stem, a swivel supported thereby and oscillative in a plurality of planes and clamping means associated with the swivel adapted to engage said grooves in the slider shoe to secure the slider shoe to the swivel.

2. In a current collector for a trolley pole, the combination of, a fixed member, a rotatable stem, a swivel member mounted on the rotatable stem adapted to oscillate in a plurality of planes, a slider shoe having a plurality of longitudinal grooves therein, means including a single through bolt disposed to secure the swivel in association with the rotatable stem, and clamping means associated with said through bolt operable to engage the grooves in the slider shoe to maintain it in fixed relation with the swivel.

3. A current collector for a trolley pole comprising, in combination, a fixed member, a stem rotatably supported by the fixed member and adapted to rotate about a single axis, a swivel mounted on said stem and adapted to oscillate about a plurality of axes, clamp means associated with the swivel, means including a single through bolt adapted to maintain the stem, swivel and clamp means in unitary relation and a longitudinally grooved slider shoe disposed to be secured in operating relation with the swivel by said clamp means, said slider shoe being removable from the swivel without removal of the clamp means.

4. The combination in a current collector device of, a fixed member, a bearing stem rotatably supported by the fixed member, a swivel body oscillatively secured to the stem, a grooved slider shoe for engaging a trolley wire adapted to be secured to the swivel body, means including a single through bolt disposed to maintain the swivel body and the stem in operative relation, and a pair of clamp members associated with the through bolt and slider shoe grooves operable to secure the slider shoe to the swivel.

5. The combination in a current collector device of, a unitary assembly including a rotatable stem, a swivel member associated therewith, and clamp means including a single non-removable through bolt adapted to secure the rotatable stem and swivel member in operating relation, and a slider shoe adapted to be detachably secured to the swivel by said clamp means, said slider shoe alone being removable upon loosening of said through bolt.

6. A current collector device comprising, a support stem, a swivel member oscillative with respect to the stem, a slider shoe provided with a plurality of grooves, a slidable conducting member disposed between the slider shoe and the stem to increase the conductivity therebetween, oppositely disposed clamp means associated with the swivel disposed to engage the grooves in the slider shoe, and means including a single transverse through bolt disposed to maintain the slider shoe, clamp means, swivel member and stem in operating relation.

7. In a current collector device the combination comprising, a fixed body member, a stem rotatably mounted therein, a swivel member mounted on said stem to oscillate about a plurality of axes, a grooved slider shoe adapted to be removably secured in position on the swivel member, clamp means recessed in the swivel member disposed to engage a slider shoe groove, and means including a single non-removable through bolt adapted to secure the said stem, swivel member and slider shoe in operating relation, the slider shoe alone being removable without removal of said through bolt.

8. A current collector device comprising the combination of, a fixed bearing member, a rotatable stem disposed therein, a swivel member oscillatively disposed in relation to said stem, a slider shoe provided with a plurality of longitudinal side grooves, a clamp member recessed in the side of the swivel and disposed to engage a longitudinal groove in the slider shoe, and means including a single through bolt adapted to maintain the slider shoe, swivel member and stem in operating relation, said slider shoe being removable upon release of said clamp members by loosening said through bolt.

9. A current collector device comprising, a fixed bearing member, a stem rotatably secured thereto, a swivel member carried by the stem oscillative in a plurality of planes with respect to the bearing member, a current collecting slider shoe having longitudinal lateral recesses therein, a flat conducting spring positioned between the slider shoe and the stem for increasing the conductivity therebetween, clamp means associated with the swivel member to engage lateral recesses of the slider shoe, and means including a single through bolt adapted to retain the swivel, stem, and slider shoe in operating relation, the slider shoe alone being removable by loosening the through bolt.

10. In a current collector device, in combination, a fixed mounting means, a swivel member supported thereby and oscillative in a plurality of planes, a slider shoe adapted to be removably secured to the swivel member, recessed clamp means associated with the swivel member, and means including a single transverse through bolt secured in the swivel member adapted to cooperate with the clamp means to secure the slider shoe, and the assembly of the swivel body and mounting means in operating relation with respect to each other, said slider shoe being removable without removal of the through bolt.

11. The combination in a current collector device of, a fixed member, a swivel member associated with the fixed member and disposed to oscillate in a plurality of planes, a slider shoe provided with downwardly extending positioning flanges and longitudinal lateral grooves, and clamp means including a transverse through bolt associated with the swivel member disposed to engage the lateral slider shoe grooves and secure the slider shoe in relation to the swivel member.

12. A current collector for an electric vehicle comprising, a fixed bearing member, a unitary assembly including a swivel member rotatably supported on the bearing member, a clamp member and a transverse bolt member for maintaining the swivel member and clamp member in operating relation, and a removable slider shoe adapted to be secured to the swivel member by engagement with the clamp member.

WILLIAM SCHAAKE.